US005425995A

United States Patent [19]

Unruh

[11] Patent Number: 5,425,995
[45] Date of Patent: Jun. 20, 1995

[54] COMPOSITION AND PROCESS FOR PREVENTING ELECTROSTATIC DISCHARGE

[76] Inventor: Greg R. Unruh, 1314 Rosemont, Amarillo, Tex. 79106

[21] Appl. No.: 199,736

[22] Filed: Feb. 22, 1994

Related U.S. Application Data

[62] Division of Ser. No. 2,709, Jan. 11, 1993, Pat. No. 5,320,780.

[51] Int. Cl.$^6$ ............................................. B05D 5/12
[52] U.S. Cl. ............................... 428/461; 427/393.1; 428/518; 428/922
[58] Field of Search ............................ 427/393.1, 242; 428/461, 511, 518, 540, 541, 922

[56] References Cited

U.S. PATENT DOCUMENTS

| 4,025,463 | 5/1977 | Trevoy | 252/500 |
| 4,237,194 | 12/1980 | Upson et al. | 252/500 |
| 4,258,079 | 3/1981 | Economy et al. | 427/44 |
| 4,935,163 | 6/1990 | Cameron | 252/500 |
| 5,093,439 | 3/1992 | Epstein et al. | 252/500 |
| 5,106,537 | 4/1992 | Nelson et al. | 252/500 |
| 5,109,070 | 4/1992 | Epstein et al. | 525/189 |
| 5,169,672 | 12/1992 | Harima et al. | 427/108 |

FOREIGN PATENT DOCUMENTS

| 302601 | 2/1989 | European Pat. Off. . |
| 2148915A | 6/1985 | United Kingdom . |
| WO86/06049 | 10/1986 | WIPO . |
| 9211645 | 7/1992 | WIPO . |
| 9324554 | 12/1993 | WIPO . |
| 9324555 | 12/1993 | WIPO . |
| 9405016 | 3/1994 | WIPO . |

OTHER PUBLICATIONS

"Synthesis of Self-Doped Conducting Polyaniline"; pp. 2800-2801; *J. Am. Chem. Soc.* (1990); Authors-Jiang Yue and Arthur J. Epstein.

"Water-soluble Conducting Poly(aniline) Polymer"; pp. 180-182; *J. Chem. Soc. Chem. Commun.* (*1990*); Authors-Jean-Yves Bergeron, Jean-Wilbert Chevalier, and Lé H. Dao.

"New Soluble Polyaniline: Synthesis, Electrical Properties and Solution Electronic Spectrum"; pp. 199-207 *Synthetic Metals* (1989); Authors-Motomichi Inque, Rosa Elana Navarro and Michiko B. Inoue.

"Polyaniline: Synthesis and Characterization of the Emeraldine Oxidation State by Elemental Analysis" pp. 105-120; *L. Alcacer led. Conducting Polymers* (*1987*) by *D. Reidel Publishing Co.* Authors-A. G. MacDiarmid, J. C. Chiang, A. F. Richter, N. L. D. Somasiri and A. J. Epstein.

*Primary Examiner*—Shrive Beck
*Assistant Examiner*—Erma Cameron

[57] ABSTRACT

The invention provides for a process of using a static dissipative, polymeric composition to prevent electrostatic discharge. The static dissipative, polymeric composition is both humidity independent and water insoluble. The present invention also provides an article comprising a substrate to be protected from electrostatic discharge.

10 Claims, No Drawings

COMPOSITION AND PROCESS FOR PREVENTING ELECTROSTATIC DISCHARGE

The present application is a divisional of U.S. Ser. No. 08/002,709 filed on Jan. 11, 1993 which matured into U.S. Pat. No. 5,320,780 on Jun. 14, 1994.

TECHNICAL FIELD OF THE INVENTION

This invention relates to a composition and a process for the prevention of electrostatic discharge (ESD) by-providing a static dissipative polymeric composition and contacting it with a substrate.

BACKGROUND OF THE INVENTION

Electrostatic discharge (ESD) is one of the most destructive phenomena in modern industry, especially the electronics industry. Electrostatic discharge is defined in the U.S. Military Handbook DOD-HKPK-263 as a transfer of electrostatic charges between bodies at different potentials by direct contact or induced by an electrostatic field. Electrostatic charge can build up on non-conductive materials as the result of the capture or release of electrons. A non-conductive material can capture or release an electron by rubbing or heating it, or it can become charged through contact with another previously charged object. For example, if a non-conductive material captures an electron from one of the sources listed above, it will become negatively charged and will hold that charge. If a positively charged body comes into contact with the negatively charged non-conductive material or comes within the static field, an arc may be discharged from the non-conductive material to the positively charged material in order to dissipate the buildup of the electrical charge. This transfer of electrostatic charge causes destruction and damage to electronic components estimated at millions of dollars a year.

One of the primary generators of ESD is the movement of personnel or equipment across the floor in a manufacturing area, assembly area or shipping area. Static damage to integrated circuit components by operating personnel is becoming one of the most significant problems plaguing the electronics industry. Table 1 below represents typical electrostatic voltages generated for various types of movement:

TABLE 1

| MEANS OF STATIC GENERATION | ELECTROSTATIC VOLTAGES | |
|---|---|---|
| | 10–20% Relative Humidity | 65–90% Relative Humidity |
| Walking across carpet | 35,000 | 1,500 |
| Walking over vinyl floor | 12,000 | 250 |
| Worker at bench | 6,000 | 100 |
| Mobile storage carts On vinyl floors | 5,000 | |

Frequently, little attention is given to the ESD control of a floor or workbench that is near or adjacent to an ESD controlled area. It is not uncommon to assume that operating personnel will be sufficiently grounded with a wrist strap and therefore, the floor or workbench need not be grounded or protected from ESD. However, various non-operating personnel and equipment that may not be sufficiently grounded move in and out of work areas and interact with operating personnel, thus creating ESD and the destruction of sensitive electronic components.

As device technology advances to achieve higher speeds and greater functional density, device geometries are decreasing, line widths and spaces are getting smaller and oxide layers are getting thinner. As a result, lower voltage and current will damage sensitive electronic components. Although electronic components are most vulnerable at the chip or integrated circuit stage, when numerous integrated circuits are assembled on a board or even a final product, damage can occur. Table 2 represents the susceptibility ranges of various electronic devices:

TABLE 2

| DEVICE TYPE | RANGE OF ESD SUSCEPTIBILITY (VOLTS) |
|---|---|
| Bipolar transistors | 380–7,000 |
| CMOS | 250–3,000 |
| EPROM | 100 |
| Film resistors (thick, thin) | 300–3,000 |
| GaAsFet | 100–300 |
| MOSFET | 100–300 |
| OP-AMP | 190–2,500 |
| SAW | 150–500 |
| Schottky diodes | 300–2,500 |
| Schottky TTL | 1,000–2,500 |
| SCR | 680–1,000 |
| VMOS | 30–1,800 |

In light of the potential damage that ESD can cause to electronic components, various ESD protective coatings have been developed to be applied to non-conducting substrates to make them conductive or static dissipative. A substrate that is conductive has an electrical resistivity in the range of about $10^0$ to about $10^5$ ohms/square, whereas a substrate that is static dissipative has an electrical resistivity in the range of about $10^5$ to about $10^{12}$ ohms/square. Within the conductive or static dissipative range, static potentials may be dissipated without harming the electronic component. However, a substrate with an electrical resistivity in the conductive range may pose harm to operating personnel. Further, a substrate with an electrical resistivity of greater than $10^{12}$ ohms/square is considered to be insulative and highly destructive with respect to electronic components. Therefore, it is desirable to have an ESD protective coating that is within the static dissipative range.

The most common type of ESD protective coating in the electronics industry is based on ionic conduction, like that disclosed in Great Britain Patent No. 2,148,915A to Berbeco. Ionic conduction involves a humidity dependent coating in which small amounts of moisture are needed to allow for the migration of ions and hence the overall flow of electrons. Ionic conduction based coatings are conductive ($10^0$ to $10^5$ ohms/square) or static dissipative ($10^5$ to $10^{12}$).

However, there are shortcomings to ionic conduction based ESD protective coatings. For example, these coatings are humidity dependent. Ionic protective coatings are made up of molecules that have an atom with a positive or negative charge on one end of the molecule, such as a sodium or chlorine atom, which attracts water molecules. When the humidity is high, the abundance of water molecules will be attracted to and will build up on the protective coating. When water molecules are allowed to build up over the surface of the ionic coating, the innate conductivity of the water film dissipates the buildup of any accumulated electrical charge, thereby preventing an unwanted electrical static discharge. However, if the humidity drops below 20%, ionic conduction is drastically minimized such that operating technicians, just walking across the floor to the workbench, will build up a static electric charge sufficient to damage an electronic component (See Tables 1 and 2). Another disadvantage to humidity dependent ionic conduction is that when the humidity decreases to about 20%, the air itself, being dry, becomes part of the electrostatic buildup mechanism every time there is an air flow (e.g., wind, air conditioning, blower) passing over an insulated substrate.

Yet another disadvantage of ionic conduction protective coatings is that they are easily degraded by contact with water or detergent solutions. The protection provided by an ionic conduction based protective coating is greatly reduced if the coated substrate is washed with water or a detergent solution. Therefore, the substrate in need of protection must be constantly recoated.

As will be discussed below, the present invention has the technical advantage of providing ESD protection without concern for the level of humidity. Because the present invention is water insoluble, it has the technical advantage of allowing coated substrates (e.g., floors, workbenches, etc.) to be washed or cleaned without removing the ESD protective coating. Moreover, the composition can be applied to objects with identification numbers, etc. because it forms a clear film when dried.

SUMMARY OF THE INVENTION

In accordance with the present invention, there is provided a static dissipative self-protonating polymeric composition that is both humidity independent and water soluble. The polymeric composition comprises a protonic acid self-protonating conducting polymer, a non-ionic suffactant, an acrylic emulsion, a soft polyethylene emulsion, a hard polyethylene emulsion, a glycol ether, and at least one plasticizer in an aqueous solution. The protonic acid self-protonating conducting polymer component is an aromatic unsaturated cyclic hydrocarbon containing repeating units of one or more cyclic rings bridged with a nitrogen amine and repeating units of the same ring systems bridged with nitrogen imines. The aromatic unsaturated ring systems which make up the backbone structure of the polymer can be unsaturated rings systems, such as benzenes, cyclopentadienyls, naphthalenes or indenes. Preferably, however, the protonic acid self-protonating conducting polymer is either a phosphated or sulfonated polyaniline, and more preferably, it is a sulfonated polyaniline.

Once the composition is applied to a substrate and allowed to dry, it provides ESD protection by providing a static dissipative polymeric composition that is humidity independent and water insoluble that provides a static dissipative level of ESD protection in the range of from about $10^5$ to about $10^{12}$ ohms/square over the surface of the substrate.

In one aspect of the present invention, a composition for preventing electrostatic discharge (ESD) is offered which provides a static dissipative polymeric composition that is humidity independent, water insoluble and clear. In this preferred embodiment, the static dissipative polymeric composition comprises a non-ionic surfactant, a sulfonated polyaniline, an acrylic emulsion, soft polyethylene emulsion, hard polyethylene emulsion, glycol ether, and at least one plasticizer in an aqueous solution. When contacted with the substrate and allowed to dry, it provides the surface of the substrate with an electrical resistivity in the range of about $10^5$ to about $10^{12}$ ohms/square.

In another aspect, the present invention provides for an article comprising a substrate that has been contacted with the static dissipative polymeric composition. The substrate, after being contacted with the static dissipative polymeric composition, has an electrical resistivity of $10^5$ to $10^{12}$, thus allowing for the protection of electronic components from ESD without detrimentally exposing operating personnel to health risks.

A long-felt need exists for a static dissipative ESD protective coating that is humidity independent, water insoluble and preferably clear. Accordingly, one aspect of the present invention discloses a composition and a process for preventing ESD by providing a static dissipative, non-ionic polymeric composition that is humidity independent, water insoluble and clear. In accordance with the present invention, ESD is prevented by contacting a substrate to be protected, such as concrete, vinyl or wooden floors, metal and wooden workbenches, or any insulative substrate that has a potential to cause damage to electronic components, with a static dissipative, non-ionic polymeric composition.

DETAILED DESCRIPTION OF THE INVENTION

The present invention provides a static dissipative polymeric composition for preventing Electrostatic Discharge (ESD) and a process for contacting the composition to a substrate to be protected from ESD with the polymeric composition. The static dissipative polymeric composition of the present invention comprises a protonic acid self-protonating conducting polymer, a non-ionic surfactant, an acrylic emulsion, a soft polyethylene emulsion, a hard polyethylene emulsion, glycol ether and at least one plasticizer in an aqueous solution. Once applied to the substrate and allowed to dry, the composition provides a coating that is humidity independent and water insoluble. It is the self-protonating polymer which gives the composition the humidity independence which sets it apart from static dissipative compositions found in the prior art. As previously discussed, the static dissipative compositions of the prior art are usually in a cationic or anionic form having a hydrophilic end that attracts airborne water molecules. As a result, a conducting film of water forms over the surface of the substrate. Thus, the effectiveness of these static dissipative compositions varies with the level of humidity that is present in the air. In contrast, the static dissipative composition of the present invention, for reasons stated above, does not require water molecules to be conductive and is thus humidity independent. After the composition is allowed to dry, the substrate has an electrical resistivity in the range of about $10^5$ to about $10^{12}$ ohms/square.

The non-ionic surfactant used in the polymeric composition may be a linear ethoxylated alcohol, a propoxylated alcohol, nonylphenol ethoxylate, octyl phenol ethoxylate, alkyl polyoxyalkylene ether, a branched polyoxyalkylene fatty alcohol, a branched ethoxylated alcohol or a polyoxyalkylene alcohol. The non-ionic surfactant may be an octyl phenol ethoxylate or a nonylphenol ethoxylate with the latter being the preferred non-ionic surfactant. The percentage by weight of the non-ionic surfactant to the total weight of the composition is preferably in the range from about 0.1% to about 1.0%, and more preferably is 0.16%.

While the protonic acid self-protonating conducting polymer in the preferred embodiment of the present invention is a sulfonated polyaniline, it should be understood that other aromatic conducting polymer systems may be used in place of polyaniline as the static dissipative conducting component. For example, the protonic acid self-protonating conducting polymer component may be any aromatic unsaturated cyclic hydrocarbon with repeating units of one or more rings bridged with a nitrogen amine and repeating units of the same ring systems bridged with a nitrogen imine, as illustrated in FIG. 1.

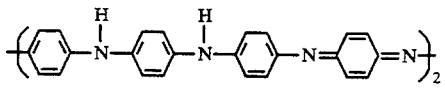

FIG. 1

In addition, the ring systems may have an anionic group such as a sulfonate group or a phosphate group bonded to it. In fact, it is more common for every other ring system to have an anionic group bonded to it, as illustrated in FIG. 2.

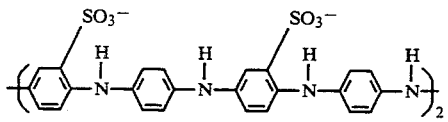

FIG. 2

The aromatic unsaturated ring systems which make up the backbone structure of the polymer can be unsaturated rings systems, such as benzene, cyclopentadienyls, naphthalenes or combinations of those ring systems. Preferably, the anionic substituents attached to those ring systems is either a phosphate group or a sulfonate group, the protonic acid self-protonating conducting polymer is either a phosphated or sulfonated polyaniline with a percentage weight to the total weight of the composition in the range from about 1% to about 5%, and preferably is about 2%. More preferably, however, the self-protonating conducting polymer is a sulfonated polyaniline like that disclosed in "Synthesis of Self-Doped Conducting Polyaniline," J. Am. Chem. Soc. 1990 112, 2800–2801, which is incorporated herein by reference.

When in the solution phase, the self-protonating polymer has different chemical properties than it does when the aqueous solution dries. In the preferred embodiment, the sulfonated polyaniline, and resonant forms thereof, is insoluble in water (See FIG. 2). Thus, to make the polyaniline soluble with the other components in the aqueous solution, the polyaniline is reacted with ammonia hydroxide to form the corresponding ammonium salt that is associated with the sulfonate group on the aromatic ring, as illustrated in FIG. 3.

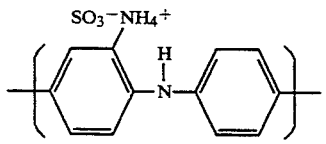

FIG. 3

The presence of the ammonium salt makes the polyaniline soluble in water which allows it to be readily mixed with the other composition components. After the composition has been applied to the substrate, it begins to dry. As it drys, the ammonium is driven off and the polyaniline immediately protonates the imine nitrogen atoms to give the polymer its conductive characteristics that are independent on the amount of humidity present in the air.

The acrylic emulsion of the above polymeric composition consists of an acrylic polymer with metal cross-linking in a water and glycol ether solution. The acrylic polymer may be a 40% copolymer consisting of ethyl methacrylate, methyl methacrylate, styrene and isobutyl methacrylate. Preferably, the percentage weight of the acrylic emulsion to the total weight of the composition is in the range from about 30% to about 40%, and more preferably is about 35.91%.

The soft polyethylene emulsion of the above polymeric composition may be a 30–40% low molecular weight solid polyethylene emulsion that constitutes from about 1.0% to about 10.0% by weight of the total composition, and more preferably is about 5.06% by weight of the total composition.

The hard polyethylene emulsion of the above polymeric composition may be a 30–40% high molecular weight solid polyethylene emulsion that constitutes from about 1.0% to about 10.0% by weight of the total composition, and more preferably is about 1.69% by weight of the total composition.

Another ingredient used in the present composition is a glycol ether. The glycol may be selected from the group consisting of any dihydric or polyhydric alcohol. Preferably, the alcohol is an aliphatic dihydric alcohol which is selected from the group consisting of ethanediol, propanediol, butanediol, or pentanediol. More preferably, the glycol ether is a diethylene glycol monomethyl ether. The percentage by total weight of the composition of the glycol ether ranges from about 1.0% to about 7.5 and more preferably, is about 4.32%.

Yet another ingredient used in the present composition is at least one plasticizer. Preferably, the first plasticizer, plasticizer A, of the above polymeric composition is a phthalate ester, including benzylbutyl phthalate, dibutyl phthalate, dioctyl phthalate, or benzyloctyl or compositions similar thereto. More preferably, however, plasticizer A is a benzylbutyl phthalate. A second plasticizer, plasticizer B, may also be used and it is preferred that a second plasticizer be used. When a second plasticizer is used, the preferred compound is a tributoxyethyl phosphate. The preferable concentration of the first plasticizer, A, is in the range of from about 0.9% to about 2% by total weight of the composition and more preferably is 0.97% by weight. Likewise, the preferred concentration of the second plasticizer, B, is in the range of from about 0.9% to about 2% by total weight of the composition with the more preferred concentration being 0.97%.

The aqueous portion of the composition is water and preferably, deionized water, which comprises from about 40% to about 60% by total weight of the composition, and more preferably, comprises about 49.12%.

The static dissipative polymeric composition of the present invention is non-ionic, and therefore, humidity independent. Furthermore, the static dissipative polymeric composition of the present invention is water insoluble with a pH of about 8.80 to about 9.00, thus allowing for the cleaning or washing of a substrate to be protected without removing the static dissipative polymeric composition from the substrate. The static dissipative polymeric composition of the present invention can be manually or robotically applied to a substrate to be protected, such as a floor, workbench, integrated circuit (IC) rails, or tote boxes.

The present invention also provides for an article comprising a substrate to be protected from ESD. The substrate, after being contacted with the static dissipative polymer composition of the present invention, has an electrical resistivity in the range of about $10^5$ to about $10^{12}$ ohms/square. The above substrate can be a floor surface such as a wooden floor, a concrete floor, a vinyl floor, a wooden, plastic or metal workbench, IC rails, metal tote boxes or similar substrates that need to be protected from ESD.

EXAMPLE

Ammonium peroxydisulfate, $(NH_4)_2S_2O_8$ (11.5 g, 0.0504 mole) was dissolved in 200 ml of 1M HCL which had been precooled to 1° C. Aniline (20.0 ml, 0.219 mole) was dissolved in 300 ml of 1M HCL which had been precooled to 1° C. The aniline solution was placed in a 750 ml Erlenmeyer flask with a magnetic stirring bar and the container was placed in an ice bath on a magnetic stirring plate.

The $(NH_4)_2S_2O_8$ solution was added to the aniline solution, with constant stirring, over a period of 1 minute. The solution was then stirred in an ice bath for ~1.5 hours during which time the temperature remained below 5° C. Three to 5 minutes after the reactants were mixed, the solution started to take on a blue-green tint and then became intense blue-green with a coppery glint as a precipitate formed. The coppery glint was less pronounced after ~1 hour.

After ~1.5 hours, the precipitate was collected on a Buchner funnel (diameter 7.5 cm) using a water aspirator. The precipitate cake was washed portion-wise (60 ml/portions) with 1M HCL until the initially pale violet filtrate became colorless. The liquid level was constantly adjusted so that it remained above the top of the precipitate. This prevented cracking of the precipitate cake, which would result in inefficient washing of the precipitate. A minimum of 500 ml of 1M HCL was used, this "as-made" precipitate is polyaniline in the incompletely protonated emeraldine hydrochloride form.

After the above washing, the precipitate remained under suction for ~10 minutes until significant cracking of the moist filter cake occurred. It was then transferred on the filter paper to a vacuum desiccator and dried under dynamic vacuum for ~2 hours.

The moist emeraldine hydrochloride precipitate cake obtained after the 10-minute suction treatment in the Buchner funnel described above was suspended with constant stirring in 500 ml 0.1M $NH_4OH$ solution. If, after 10 minutes, the pH of the suspended liquid was <8, 1.0M $NH_4OH$ was added drop-wise to bring the pH up to ~8. The suspension was stirred for ~15 hours. The powder was collected on a Buchner funnel (diameter 7.5 cm) and was washed with 500 ml of 0.1M $NH_4OH$ in 60 ml portions, precautions to avoid cracking of the filter cake being taken as described above. The powder was resuspended in an additional 500 ml of 0.1M $NH_4OH$ and was stirred for 1 hour, collected on a Buchner funnel and washed with 500 ml of 0.1M $NH_4OH$ in 60 ml portions. The powder was partially dried under suction on a Buchner funnel for ~10 minutes. The moist emeraldine base powder was then transferred on the filter paper to a desiccator and was dried under dynamic vacuum for ~4 hours.

Emeraldine hydrochloride powder (I) was synthesized from an aqueous solution of aniline, $(NH_4)S_2O_8$, and HCL. It was then convened to analytically pure emeraldine base (II) via the previously described method. Emeraldine base (0.5 g) was sulfonated by being dissolved in 40 mL of fuming sulfuric acid with constant stirring. The color of the solution changed from dark purple to dark blue during ~2 hours at room temperature. The solution was then slowly added during ~20 minutes to 200 mL of methanol to precipitate most of the product, the temperature being held between 10° and 20° C. by an ice bath. Precipitation was completed by the addition of 100 mL of acetone. The green powder was then collected on a Buchner funnel, and the precipitate cake was washed at least 10 times with ~50-mL portions of methanol until the filtrate had a pH of 7 when tested by wet pH paper. The liquid level in the Buchner funnel was constantly adjusted so that it remained above the top of the precipitate in order to prevent cracking of the precipitate cake, which would result in inefficient washing. It was then permitted to remain under suction for approximately 10 minutes; the resulting precipitate cake was slightly soluble in water, giving a green solution. The filter cake then was transferred on the filter to a vacuum desiccator and dried under dynamic vacuum for 24 hours.

Deionized water, non-ionic surfactant and the sulfonated polyaniline were all charged into a mixing vessel and stirred easily at room temperature. The pH was raised to 8.80 with 28% ammonium hydroxide and allowed to stir for at least 20 minutes. Acrylic emulsion, soft polyethylene emulsion, hard polyethylene emulsion, glycol ether, tributoxyethyl phosphate and phthalate ester were added one by one in the order listed allowing a 10-minute mixing time between each ingredient. The pH was checked again to make certain that it was between 8.80–9.00. The composition was then applied to a floor with a vinyl tile surface with a cotton string mop and was also applied to IC rails, tote boxes and other surfaces and was allowed to dry for 1.0 to 1.5 hours which gave the floor a resistivity of $5 \times 10^8$ ohms/square.

Various modifications are contemplated which will be apparent to those skilled in the art and can be applied to the preferred embodiment described above without departing from the spirit and scope of the invention as defined by the following claims.

I claim:

1. A process for preventing electrostatic discharge, comprising the steps of:
   (a) providing a static dissipative polymeric composition with a conductivity, said static dissipative polymeric composition comprising: a non-ionic surfactant; a sulfonated polyaniline; an acrylic emulsion; a soft polyethylene emulsion; a hard polyethylene emulsion; a glycol ether, and at least one plasticizer, wherein the polymeric composition is in an aqueous solution;
   (b) contacting a substrate with said static dissipative polymeric composition, whereby said substrate, after being contacted with said static dissipative polymeric composition, has an electrical resistivity in the range of about $10^5$ to about $10^{12}$ ohms/square.

2. A method as in claim 1, wherein the conductivity of said static dissipative polymeric composition is humidity independent.

3. A method as in claim 1, wherein the pH of said static dissipative polymeric composition is in the range of about 8.80 to about 9.00.

4. An article comprising a substrate, said substrate having been contacted with the static dissipative polymeric composition of claim 1.

5. An article as in claim 4 wherein said substrate has an electrical resistivity in the range of about $10^5$ to about $10^{12}$ ohms/square.

6. An article as in claim 4, wherein said substrate is a workbench.

7. An article as in claim 4, wherein said substrate is a floor.

8. An article as in claim 4, wherein said substrate is an integrated circuit rail.

9. An article as in claim 4, wherein said substrate is a tote box.

10. A process for preventing electrostatic discharge, comprising the steps of:

(a) providing a static dissipative polymeric composition, said static dissipative polymeric composition comprising: a sulfonated polyaniline which comprises about 2% by weight of the composition; a nonylphenol ethoxylate which comprises about 0.16% by weight of the composition; an acrylic emulsion consisting of ethyl methacrylate, methyl methacrylate, styrene and isobutyl methacrylate which comprises about 35.91% by weight of the composition; a low molecular weight soft polyethylene emulsion comprising about 5.06% by weight of the composition; a high molecular weight hard polyethylene emulsion comprising about 1.69% by weight of the composition; a diethylene glycol monomethyl ether comprising about 4.32% by weight of the composition; a first plasticizer benzylbutyl phthalate comprising about 0.97% by weight of the composition; a second plasticizer tributoxyethyl phosphate comprising about 0.97% by weight of the composition, in an aqueous solution which comprises about 49.12% by weight of the composition;

(b) contacting a substrate with said static dissipative polymeric composition, whereby said substrate, after being contacted with said static dissipative polymeric composition, has an electrical resistivity in the range of about $10^5$ to about $10^{12}$ ohms/square.

* * * * *